United States Patent [19]

Tarjan

[11] Patent Number: 5,083,587
[45] Date of Patent: Jan. 28, 1992

[54] WATER LEVEL AND EXCHANGE SYSTEM

[76] Inventor: Laszlo Tarjan, 3007 Boucherie Road, Kelowna, BC V1Z-2G8, Canada

[21] Appl. No.: 608,045

[22] Filed: Oct. 31, 1990

[51] Int. Cl.$^5$ .............................................. B01F 5/04
[52] U.S. Cl. ........................................ 137/565; 119/5; 137/562; 210/416.2
[58] Field of Search ............... 137/562, 565, 892, 893; 119/5; 210/416.2

[56] References Cited

U.S. PATENT DOCUMENTS

| | | | |
|---|---|---|---|
| 3,171,427 | 3/1965 | McAlpine | 137/893 X |
| 3,301,486 | 1/1967 | Brock | 137/892 X |
| 3,304,564 | 2/1967 | Green | 137/562 X |
| 3,598,288 | 8/1971 | Posgate | 137/892 |
| 4,014,052 | 3/1977 | Wolos | 137/562 |
| 4,610,784 | 9/1986 | Reyniers | 210/416.2 |
| 4,826,591 | 5/1989 | Macia | 210/416.2 X |

Primary Examiner—Robert G. Nilson
Attorney, Agent, or Firm—H. Jay Spiegel

[57] ABSTRACT

Disclosed is a system for replacing dirty aquarium water with fresh, clean aquarium water and making up for evaporation, thus keeping the aquarium water level constant. The inventive system includes a passageway for supplying clean water to an aquarium, which passageway has a bypass port leading to a throat designed to cause a pressure reduction. The throat is fluidly connected to an aquarium outlet located at the surface of the aquarium so that the reduction in pressure at the throat causes a suction effect to remove dirty water from the surface of the aquarium. Downstream of the throat, the dirty water is conveyed to a waste outlet.

6 Claims, 1 Drawing Sheet

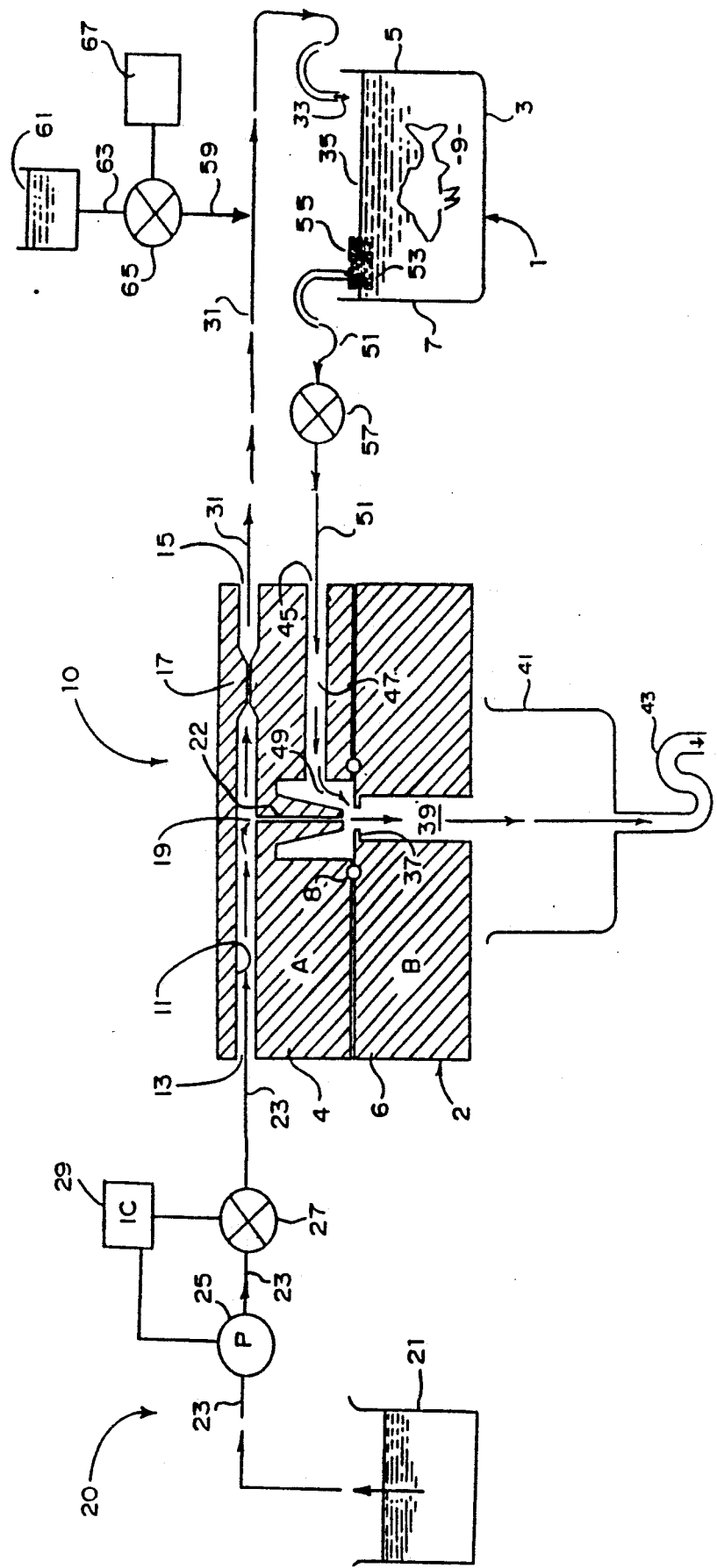

WATER LEVEL AND EXCHANGE SYSTEM

BACKGROUND OF THE INVENTION

The present invention relates to a water level and exchange system. In the prior art, fluid handling systems including the use of a syphoning effect are known. Such a device is taught by U.S. Pat. No. 1,025,608 to Bliss.

U.S. Pat. No. 2,620,819 to Campbell teaches a system designed to be used to maintain a desired level of water in an enclosure. Such a device is also taught by U.S. Pat. No. 1,191,724 to Owens.

The present invention differs from the teachings of these patents as providing a system wherein pressure from inlet flow to an aquarium is utilized in a way which causes removal of dirty water from the aquarium.

SUMMARY OF THE INVENTION

The present invention relates to a water level and exchange system. The present invention includes the following interrelated objects, aspects and features:

A) In a first aspect, the present invention includes a main fluid handling device which includes a flow passageway having a restricted orifice. Downstream of the restricted orifice is a conduit intended to supply fresh water to an aquarium.

B) Upstream of the restricted orifice, a tap-off line is provided which terminates at a throat having a lateral inlet. As is understood by those skilled in the art, at the area of the throat, a pressure reduction occurs which causes a suction effect on the lateral inlet.

C) The lateral inlet is connected via a conduit to a port opening at the surface of the above-mentioned aquarium. Thus, flow of water through the flow passageway causes, via the tap-off line, the throat and the lateral inlet, suction of dirty water from the aquarium, via the lateral inlet and throat to an outlet connected to a waste drain.

As such, it is a first object of the present invention to provide a water level and exchange system.

It is a further object of the present invention to provide such a system including means for supplying clean water to an aquarium which means also provides the impetus for removing dirty water therefrom.

It is a still further object of the present invention to provide such a device including provision for addition of purifying substance to the water being supplied to the aquarium as well as a timer control designed to control operation of the system.

These and other objects, aspects and features of the present invention will be better understood from the following detailed description of the preferred embodiment when read in conjunction with the appended drawing figures.

BRIEF DESCRIPTION OF THE DRAWINGS

The sole FIGURE depicts a schematic representation of the present invention.

SPECIFIC DESCRIPTION OF THE PREFERRED EMBODIMENT

With reference to the sole FIGURE, a main fluid handling device is generally designated by the reference numeral 10 and includes a flow passageway 11 having an inlet port 13, an outlet port 15, a restricted orifice 17, and a lateral port 19 defining the inlet of a tap-off line 22.

The inlet port 13 is connected to a source of clean water generally designated by the reference numeral 20 and including a reservoir 21, a conduit 23, a pump 25 and a valve 27. The valve 27 may, if desired, be controlled by an integrated circuit 29 which may include a timer mechanism designed to open the valve 27 and activate the pump 25 at predetermined prearranged times of the day and night.

The outlet port 15 is connected to a conduit 31 which has an outlet 33 disposed above level 35. In this way, the water will be slowly dripped into the aquarium, thus helping to dissipate at the water's surface 35 any chlorine gas that may be in the water supply. The aquarium 1 includes a bottom wall 3, side walls 5 and 7 and contains water 9 filled to the level 35.

With reference back to the main fluid handling device 10, the tap-off line 22 terminates at a throat 37 which leads to a further passageway 39 fluidly connected to a waste sink 41 having a drain mechanism 43.

The main fluid handling device 10 also includes a lateral inlet 45 leading to a passageway 47 terminating at a port 49 adjacent the throat 37.

The lateral inlet 45 is fluidly connected via the conduit 51 to the inlet port 53 thereof via a filter 55. As shown in the sole figure, the inlet port 53 and filter 55 are at the fluid level 35 as will be explained in greater detail hereinafter. A valve or variable restrictor 57 is provided in the conduit 51 for a purpose to be described in greater detail hereinafter.

Furthermore, the conduit 31 may have, connected thereto, a branch conduit 59 designed to supply purifying liquid 61 to the conduit 31 and thereby to the aquarium 1 via the conduit 63, valve 65 and conduit 59. The valve 65 may be controlled by a controller 67 designed to control the amount of purifying liquid 61 which is dispensed into the conduit 31 over a desired period of time.

In the operation of the inventive system, the controller 29 is set as desired to open the valve 27 and activate the pump 25 at desired times. When the pump 25 and valve 27 are activated, clean water is pumped through the conduit 23 and enters the main fluid handling device 10 at the port 13. This water flows through the restricted orifice 17, out the port 15 and through the conduit 31 to the outlet port 33 thereof above the level 35 of water within the aquarium 1. If desired, the purifying fluid or other additives 61 is allowed to enter the conduit 31 via the conduit 63, valve 65 as controlled by the controller 67 and conduit 59.

Concurrently, water within the flow passageway 11 exits at the port 19 and travels through the tap-off line 22 at high pressure and exits at the throat 37 traveling down the conduit 39 to the waste sink 41 and thence to the drain mechanism 43. As is known to those skilled in the art, flow of water through the throat 37 in this manner causes a reduction in pressure at the port 49 defining the terminus of the lateral passageway 47 having lateral inlet 45.

Provided the valve 57 is in the open position, this reduction in pressure will cause a suction effect sucking water 9 from the aquarium 1 through the filter 55, thence through the port 53 of conduit 51 and through the conduit 51 through valve 57 to enter the lateral passageway 47, pass through the throat 37 and entrain with the water flowing through tap-off line 22 whence it flows to the waste sink 41 and drain 43.

As should be understood by those skilled in the art, the valve 57 is adjusted to adjust the amount of flow through the conduit 51 such that the flow through the conduit 51 is at least slightly greater than the flow of water through the conduit 31 and into the aquarium at the port 33. This is because were the volume of fluid per increment of time flowing within the conduit 51 to be less than the volume of flow per increment of time flowing through the conduit 31, the tank 1 would necessarily eventually overflow.

Thus, in the operation of the present invention, periodically, the suction force causing flow of fluid through the conduit 51 will cause the port 53 to be slightly above the surface 35 of the water thereby stopping flow of fluid through the conduit 51 until such time as the water in the conduit 31 exits the port 33 to fill the aquarium 1 to raise the level 35 of the water 9 therein to a level immersing the port 53 below the surface 35 of the water 9 thereby causing removal of dirty water from the aquarium 1 to resume.

In the sole figure, the main fluid handling device 10 is shown as being made as a housing 2 having a top half 4, a bottom half 6 and an O-ring seal 8 providing a fluid seal at the area of the throat 37. Of course, this structure is to be considered merely exemplary and the inventive main fluid handling device 10 may be constructed on one piece as well as of a plurality of pieces assembled together.

If desired, the restricted orifice 17 may be rendered adjustable as may the configuration of the throat 37.

As such, an invention has been disclosed in terms of a preferred embodiment thereof which fulfills each and every one of the objects of the invention as set forth hereinabove and provides a new and useful water level and exchange system of great novelty and utility. Of course, various changes, modifications and alternations in the teachings of the present invention may be contemplated by those skilled in the art without departing from the intended spirit and scope of the present invention. As such, it is intended that the present invention only be limited by the terms of the appended claims.

I claim:

1. A fluid handling system, for purifying and maintaining fluid level in a fluid reservoir, comprising:
    a) a flow passageway having an inlet, an outlet port, a restricted orifice in said flow passageway between said inlet and outlet port, a tap-off line fluidly connected to said flow passageway between said inlet and said restricted orifice, said outlet port always suspended above the fluid level in said reservoir;
    b) said tap-off line terminating remotely with respect to said flow passageway at a throat;
    c) a port adjacent said throat forming the terminus of a conduit having an entrance fluidly connected to said fluid reservoir via filter means for filtering impurities from fluid flowing therethrough; and
    d) a common discharge passage for said tap-off line and conduit;
    e) whereby flow of fluid through said tap-off line and throat entrains fluid in said conduit through said filter means while said flow passageway supplies fluid to said reservoir; and
    f) said inlet being connected to a source of fluid whereby said fluid is flowed through said flow passageway at a rate causing said fluid to be dripped from said outlet port to dissipate any chlorine gas which may be contained therein.

2. The invention of claim 1, wherein said source includes means for controllably activating and deactivating flow of fluid.

3. The invention of claim 2, said means further including a timer mechanism.

4. The invention of claim 1, said outlet having fluidly connected thereto, a source of purifying fluid or other additives.

5. The invention of claim 1, further including a valve in said conduit.

6. The invention of claim 1, wherein said reservoir comprises an aquarium.

* * * * *